US008825019B2

(12) United States Patent
Kho et al.

(10) Patent No.: US 8,825,019 B2
(45) Date of Patent: Sep. 2, 2014

(54) METHOD AND SYSTEM FOR PROVIDING PHONE DIRECTORY SERVICE FOR MOBILE COMMUNICATION SUBSCRIBER

(75) Inventors: Young-Sung Kho, Seongnam-si (KR); Young-Ky Kim, Seoul (KR); Ji-Hye Ha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 13/271,450

(22) Filed: Oct. 12, 2011

(65) Prior Publication Data

US 2012/0108218 A1    May 3, 2012

(30) Foreign Application Priority Data

Oct. 29, 2010  (KR) ........................ 10-2010-0107334

(51) Int. Cl.
*H04M 3/42* (2006.01)
*G06Q 30/00* (2012.01)

(52) U.S. Cl.
USPC .................. 455/414.1; 455/414.2; 455/414.3; 379/218.01; 705/14.49; 705/14.53; 705/14.54; 705/14.55; 705/14.66

(58) Field of Classification Search
CPC .................................. H04W 4/02; H04W 8/18
USPC .......................... 455/414.1–414.3; 379/218.1; 705/14.49, 14.53–14.55, 14.66
See application file for complete search history.

(56) References Cited

U.S. PATENT DOCUMENTS

| | | | |
|---|---|---|---|
| 8,301,371 B2 * | 10/2012 | Sheha et al. .................. 701/426 |
| 2005/0164704 A1 | 7/2005 | Winsor | |
| 2006/0072733 A1 * | 4/2006 | Ryan et al. ............... 379/211.02 |
| 2006/0287919 A1 | 12/2006 | Rubens et al. | |
| 2007/0004380 A1 | 1/2007 | Ylikoski | |
| 2007/0061301 A1 * | 3/2007 | Ramer et al. ....................... 707/3 |
| 2007/0243869 A1 * | 10/2007 | Kwon et al. ............... 455/435.1 |
| 2008/0091443 A1 * | 4/2008 | Strope et al. ....................... 705/1 |
| 2008/0172362 A1 * | 7/2008 | Shacham et al. .................. 707/3 |
| 2009/0004055 A1 * | 1/2009 | Darrigrand et al. ............. 422/61 |
| 2009/0190739 A1 | 7/2009 | McGary et al. | |
| 2009/0287682 A1 * | 11/2009 | Fujioka et al. .................... 707/5 |
| 2009/0299980 A1 | 12/2009 | Marcus | |
| 2010/0082434 A1 * | 4/2010 | Chen et al. ................. 705/14.55 |

FOREIGN PATENT DOCUMENTS

| | | | |
|---|---|---|---|
| JP | 2002-328945 A | 11/2002 |
| JP | 2006-202056 A | 8/2006 |
| JP | 2010-097461 A | 4/2010 |
| WO | 2010-104834 A2 | 9/2010 |

\* cited by examiner

*Primary Examiner* — Jinsong Hu
*Assistant Examiner* — Dung Hong
(74) *Attorney, Agent, or Firm* — Jefferson IP Law, LLP

(57) ABSTRACT

A method and system for providing a phone directory service to a user terminal in a mobile communication network are provided. The method includes receiving a search request including a search keyword for the phone directory service and a subscriber identifier for the user terminal from the user terminal, acquiring subscriber information of a subscriber possessing the user terminal from the mobile communication network in which the user terminal is registered using the subscriber identifier, acquiring a business list of businesses corresponding to the search keyword from a business DataBase (DB) for managing businesses which have subscribed to the phone directory service, arranging the business list based on a communication pattern of a group of similar subscribers which have been determined to have subscriber information similar to that of the subscriber possessing the user terminal according to a predetermined criteria, and providing the arranged business list to the user terminal.

16 Claims, 11 Drawing Sheets

METHOD AND SYSTEM FOR PROVIDING PHONE DIRECTORY SERVICE FOR MOBILE COMMUNICATION SUBSCRIBER

PRIORITY

This application claims the benefit under 35 U.S.C. §119(a) of a Korean application filed in the Korean Intellectual Property Office on Oct. 29, 2010 and assigned Serial No. 10-2010-0107344, the entire disclosure of which is hereby incorporated by reference.

BACKGROUND OF THE INVENTION

1. Field of the Invention

The present invention relates to a phone directory service. More particularly, the present invention relates to a method and a system for providing a phone directory service for a user terminal which has subscribed to a mobile communication network.

2. Description of the Related Art

A business phone directory service provides a user with a list or names of businesses (e.g., stores) pertaining to a specific category or region. The user requests a specific type of business in a specific region, and receives a list identifying businesses of the specified type. Such a service is called a "yellow page service".

Generally, a yellow page service realizes a search function for a "Yellow Book" indicating a phone directory for businesses which is published by a telephone company based on the interne, and is a new type of interne service which provides advertising and information at the same time based on an advantages of a phone directory and the convenience of access to the interne.

Recently, as a yellow page service is provided to mobile terminals, a service by which a subscriber of a mobile terminal, i.e., a user is provided with more detailed information regarding an advertising provider located near his or her location. However, until now, business information of all advertising providers which is loaded by a communication provider has been searched for regardless of an inclination of an individual user. That is, the conventional yellow page service has only listed simple information, without considering an inclination of an individual user. Thus, the technology of the related art cannot handle an effective advertising service which reflects personalities of users.

SUMMARY OF THE INVENTION

Aspects of the present invention are to address at least the above-mentioned problems and/or disadvantages and to provide at least the advantages described below. Accordingly, an aspect of the present invention is to provide a method and a system for providing a phone directory service which reflects a preference of a user.

Another aspect of the present invention is to provide a method and a system for providing a customized phone directory service where a communication provider considers a preference of an individual user without an explicit demand of the user of a mobile terminal.

Still another aspect of the present invention is to provide a method and a system for providing a customized yellow page service using phone statistics of subscribers whose subscriber profile and subscriber information of a communication provider are similar.

Yet another aspect of the present invention is to provide a method and a system for providing a customized yellow page service where a personal preference is considered by using communication patterns of subscribers whose subscriber profile and subscriber information of a communication provider are similar.

A further aspect of the present invention is to provide a method and a system for storing communication patterns of a group of subscribers whose subscriber information is similar and giving a high priority to the businesses searched for based on the stored communication patterns.

A still further aspect of the present invention is to provide a method and a system for providing detailed information and an image needed by the user during a call with a business provided through a search service to the user.

A yet further aspect of the present invention is to provide a method and a system for providing detailed information desired by the user through an interaction between the user and a business provided through a search service during a call between the user and the business.

Yet still another aspect of the present invention is to provide a method and a system for implementing authentication and payment through an interaction between the user and a business provided through a search service during a communication between the user and the business.

In accordance with an aspect of the present invention, a method of providing a phone directory service to a user terminal in a mobile communication network is provided. The method includes receiving a search request including a search keyword for the phone directory service and a subscriber identifier for the user terminal from the user terminal, acquiring subscriber information of a subscriber possessing the user terminal from the mobile communication network in which the user terminal is registered using the subscriber identifier, acquiring a business list of businesses corresponding to the search keyword from a business DataBase (DB) for managing businesses which have subscribed to the phone directory service, arranging the business list based on a communication pattern of a group of similar subscribers which have been determined to have subscriber information similar to that of the subscriber possessing the user terminal according to a predetermined criteria, and providing the arranged business list to the user terminal.

In accordance with another aspect of the present invention, a method of providing a phone directory service for businesses is provided. The method includes receiving, when a call is generated to be sent to one of businesses which have subscribed to the phone directory service, call information regarding the call, identifying a calling number and a called number for the call in the call information, identifying a gender and an age group of a calling subscriber corresponding to the calling number, and a call origination time for the call, increasing call count values for the gender and age group of the corresponding business and a call origination time, respectively, and providing the phone directory service for businesses, considering a communication pattern including call count values for genders, age groups, and call origination times for businesses which have subscribed to the phone directory service.

In accordance with yet another aspect of the present invention, a method for providing a phone directory service to a user terminal in a mobile communication network is provided. The method includes displaying, when a search keyword for the phone directory service is input by a user, a business list including businesses corresponding to the search keyword on a screen of the user terminal, connecting a call with a business selected by the user among the businesses displayed on the screen, displaying at least one product image provided by the selected business on the screen according to an interactive communication between the user and an interactive call processing system in a network during the call connection, displaying, if a desired product is selected by the user, order details for the selected product during the call connection, processing payment of the selected product through a communication with a fee charging system in the network during the call connection, and displaying details for the payment on the screen.

In accordance with still another aspect of the present invention, a system for providing a phone directory service to a user terminal in a mobile communication network is provided. The system includes a search entity for receiving a search request including a search keyword for the phone directory service and a subscriber identifier of the user terminal from the user terminal, and for providing a search result corresponding to the search request to the user terminal, a subscriber information storage for receiving the subscriber identifier from the search entity and for providing subscriber information of the user terminal to the search entity, a business DB for managing businesses which have subscribed to the phone directory service, and for receiving the search keyword from the search entity to provide a business list of the businesses corresponding to the search keyword, and a communication pattern manager for storing and managing a communication pattern of a group of similar subscribers which have been determined to have subscriber information similar to that of a subscriber possessing the user terminal according to a predetermined criteria, wherein the search result includes a result obtained by arranging the business list based on the communication pattern of the group of similar subscribers which have been determined to have subscriber information similar to that of the subscriber possessing the user terminal.

In accordance with yet another aspect of the present invention, a system for providing a phone directory service for a mobile communication provider is provided. The system includes a search entity for, when a search keyword for the phone directory service is received from a user terminal, providing a business list to the user terminal including businesses corresponding to the search keyword, an interactive call processing system for providing interactive call processing by at least one of the businesses, and a fee charging system for providing payment and fee charging by at least one of the businesses, wherein the user terminal displays the business list on a screen of the user terminal, connects a call with a business selected among the businesses displayed on the screen by the user, displays at least one product image provided by the interactive call processing system in a network during the call connection, displays, if a product desired by the user is selected, order details for the selected product during the call connection, and processes payment of the selected product through a communication with a fee charging system in the network during the call connection and displays details for the payment on the screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a specific system configuration for providing a phone directory service will be described. However, it will be understood by those skilled in the art that an operation of providing a phone directory service according to the present invention is not limited to a specific system configuration and various changes may be made therein without departing from the spirit and scope of the invention as defined by the appended claims.

A phone directory service for businesses, i.e., a yellow page service provides results based on a keyword for a search (or search keyword) input by the user. The user inputs a search keyword using a user terminal (i.e., a mobile terminal) such as a smart phone, a Personal Digital Assistant (PDA), or a camera phone accessible to an internet search site, and a user terminal transfers an input search keyword to a search entity (e.g., a yellow page server) on a data network through a mobile communication network such as 3rd Generation Partnership Project (3GPP), Long Term Evolution (LTE), Worldwide Interoperability for Microwave Access (WiMAX), Wireless Broadband Internet (WiBro) or a Wireless Local Area Network (WLAN) such as Wireless Fidelity (Wi-Fi). A search entity inquires another server such as a business DataBase (DB) of information on businesses, and provides the user terminal with search results corresponding to a search keyword input by the user.

Figure 1:
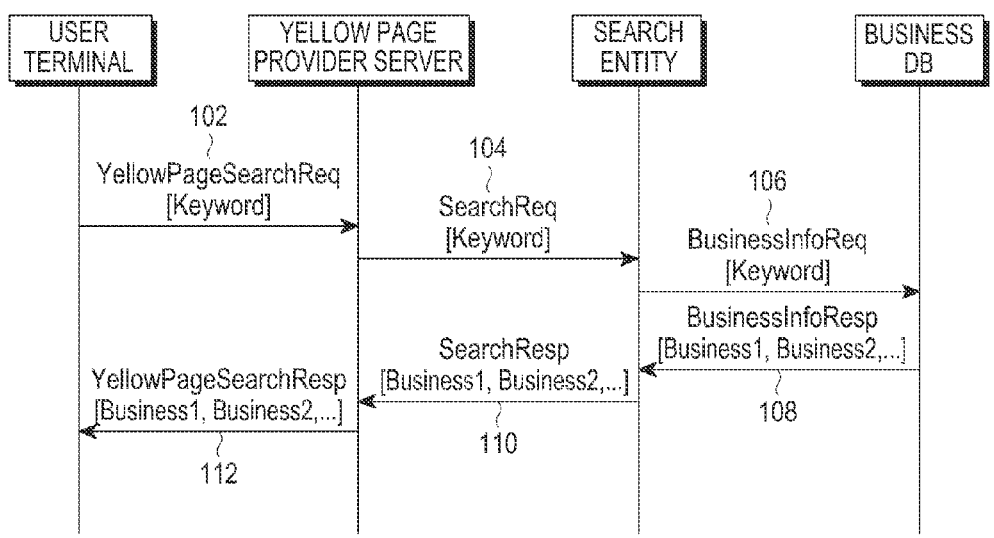
FIG. 1 is a message flowchart illustrating a yellow page search procedure according to an exemplary embodiment of the present invention.

FIG. 1 is a message flowchart illustrating a yellow page search procedure according to an exemplary embodiment of the present invention.

Referring to FIG. 1, in step 102, the user terminal transfers a yellow page search request message (YellowPageSearchReq) including a search keyword input by the user to a yellow page provider server through a network (e.g., a mobile communication network, etc.) which he or she has accessed. In step 104, the search keyword is included in a search request message (SearchReq) and is transferred from the yellow page provider server to a search entity (e.g., a yellow page server). The search entity may access the business DB and other servers to provide a search function desired by the user. In step 106, the search entity includes the search keyword in a business information request message (BusinessInfoReq) and transfers the business information request message to the business DB. The business DB stores information on businesses which have allowed a search for their phone numbers, i.e., business names, phone numbers, addresses, brief introductions, etc., and may be configured with a separate server, be constructed as an internal DB in the search entity, or be provided in the same network as that of the search entity.

In step 108, the business DB transfers a business information response message (BusinessInfoResp) including a business list corresponding to the search keyword to the search entity. The business list contains information regarding the businesses corresponding to the search keyword. For example, when the search keyword is Chinese restaurant, names and phone numbers of the Chinese restaurants stored in the business DB and their addresses and brief introductions may be contained in the business list. In step 110, the business list is included in a search response message (SearchResp) and is provided to the yellow page provider server, and in step 112, the yellow page provider server includes the business list in a yellow page search response message (YellowPageSearchResp) and provides the yellow page search response message to the user terminal.

Since the above-mentioned search procedure provides a search result corresponding to a search keyword without considering a personality or preference of the user, advertising effects are not fully utilized. In particular, despite that the user often intends to search for a business close to a location where he or she is currently located, the business DB simply provides a list containing all businesses corresponding to the search keyword. Accordingly, the user may have trouble in selecting a desired business.

Figure 2:
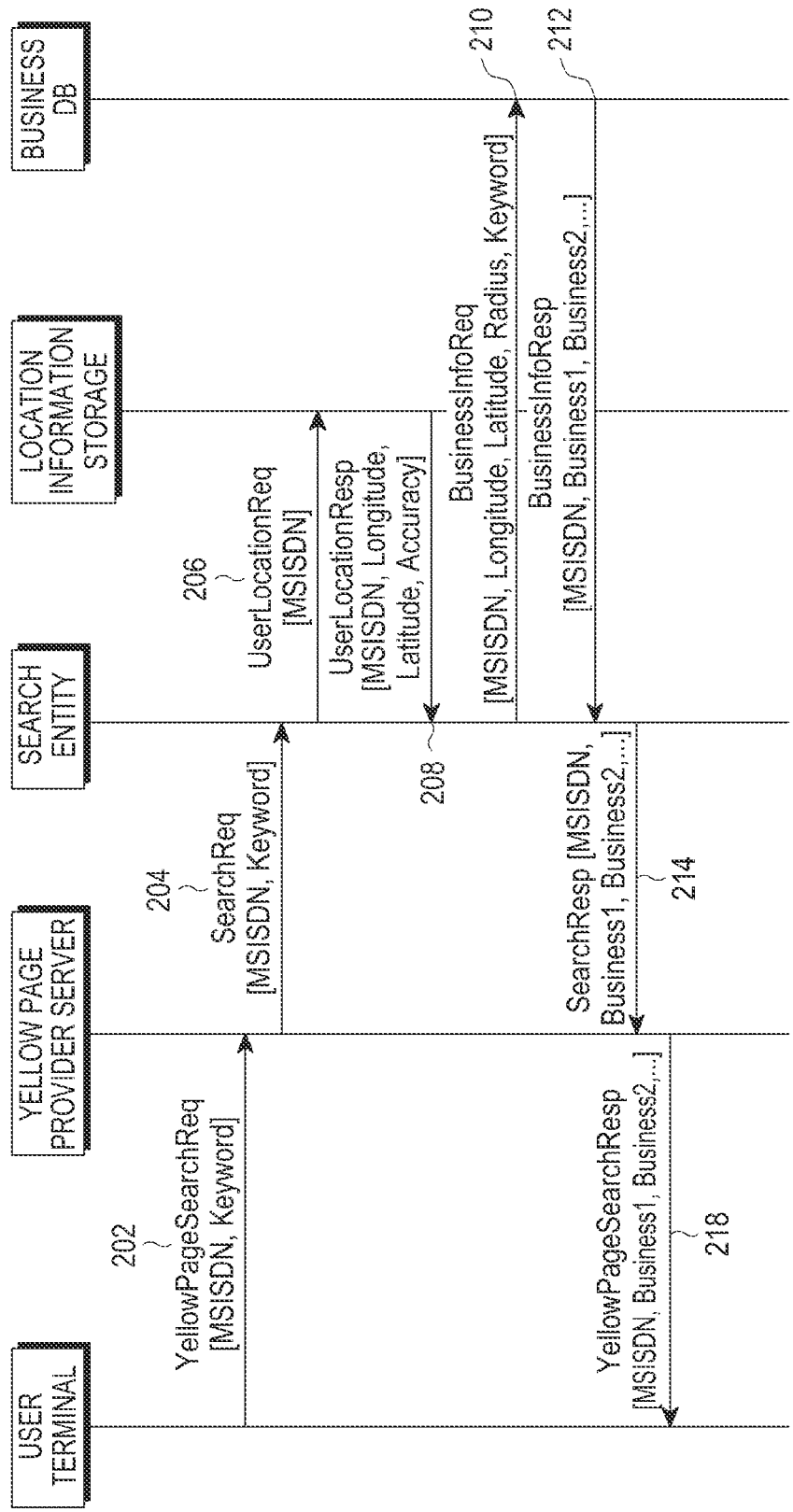
FIG. 2 is a message flowchart illustrating a yellow page search procedure where a location of a user is considered according to another exemplary embodiment of the present invention.

FIG. 2 is a message flowchart illustrating a yellow page search procedure where a location of a user is considered according to an exemplary embodiment of the present invention.

Referring to FIG. 2, in step 202, a user terminal transfers a yellow page search request message (YellowPageSearchReq) including a search keyword input by the user and a subscriber IDentifier (ID) of the user terminal to a yellow page provider server through a network (e.g., mobile communication network) accessed by the user terminal itself. The subscriber identifier is used to identify the user terminal in the mobile communication network, and may include at least one of a Mobile Station International Integrated Service Digital Network (ISDN) (MSISDN) number, a Mobile Identifying Number (MIN), an International Mobile Equipment Identity (IMEI), an Integrated Circuit Card IDentifier (ICCID), an International Mobile Subscriber Identity (IMSI), etc.

In step 204, the subscriber identifier and the search keyword are included in a search request message (SearchReq) and are transferred from the yellow page provider server to a search entity (e.g., a yellow page server). In step 206, the search entity includes the subscriber identifier into a user location request message (UserLocationReq) and transmits the user location request message including the subscriber identifier to a location information storage (e.g., a location server). The location information storage identifies locations of mobile communication subscribers (i.e., users) registered in the mobile communication network to help receive a call, and manages various parameters/information regarding the subscribers to control various added services such as prohibition of call origination/termination. An example of the location information storage may be a home location register. For the interworking with the location information storage, the search entity may operate in the same provider network as that of the location information storage, or may mutually share communication protocols according to a preset manner. In step 208, the location information storage searches for a currently registered location, e.g., a cell ID or a latitude/longitude of the user terminal corresponding to the subscriber identifier, and sends, in response, a user location response message (UserLocationResp) including the subscriber identifier and the searched location (e.g., a latitude and a longitude) to the search entity. Here, the user location response message (UserLocationResp) may additionally indicate a precision of the location. Here, the precision of the location refers to an error degree in the latitude and longitude of the location.

In step 210, the search entity includes the search keyword together with the subscriber identifier, the location, and a radius about the location in a business information request message (BusinessInfoReq) and transfers the business information request message to the business DB. The radius may be optionally included. The radius indicates which businesses pertaining to a region within a certain range from the location of the subscriber will be searched for in the yellow page service, and may be determined in the search entity according to a service precision or input by the user through the user terminal. The business DB stores information, i.e., business names, phone numbers, addresses, brief introductions of the businesses which have allowed a search for their phone numbers, etc., and may be configured with a separate server, be constructed as an internal DB in the search entity, or be provided in the same network as that of the search entity.

In step 212, the business DB transfers a business information response message (BusinessInfoResp) including a business list corresponding to the search keyword to the search entity. The business list corresponds to the search keyword, and contains information regarding businesses located within the range of the radius about the location of the subscriber. To achieve this, the business DB additionally stores rough locations, i.e., districts or latitudes/longitudes of the businesses which have allowed a search for them, together with information regarding the businesses. For example, when the search keyword is Chinese restaurant, names and phone numbers of the Chinese restaurants stored in the business DB and their addresses and brief introductions may be additionally contained in the business list. In step 214, the business list is included in a search response message (SearchResp) and is provided to the yellow page provider server, and in step 218, the yellow page provider server includes the business list in a yellow page search response message (YellowPageSearchResp) and provides the yellow page search response message to the user terminal. Then, the user can acquire phone numbers of the businesses close to a region where the user is currently located through interworking of the search entity with the mobile communication network without having to separately input a geographical location to be searched for.

Although an operation of inquiring the location information storage of the mobile communication network of the location of the user terminal by the search entity has been illustrated and described, when the user terminal is equipped with a Global Positioning System (GPS) therein, the user terminal can inform its current location with the search keyword and its current location (e.g., latitude/longitude) may be included in the yellow page search request message.

Although the procedure of FIG. 2 provides more convenience for the user than that provided by the procedure of FIG. 1 by considering a current location of the user, since the businesses close to the current location of the user are listed, it is difficult to provide a search result according to personalities of users.

Figure 3:
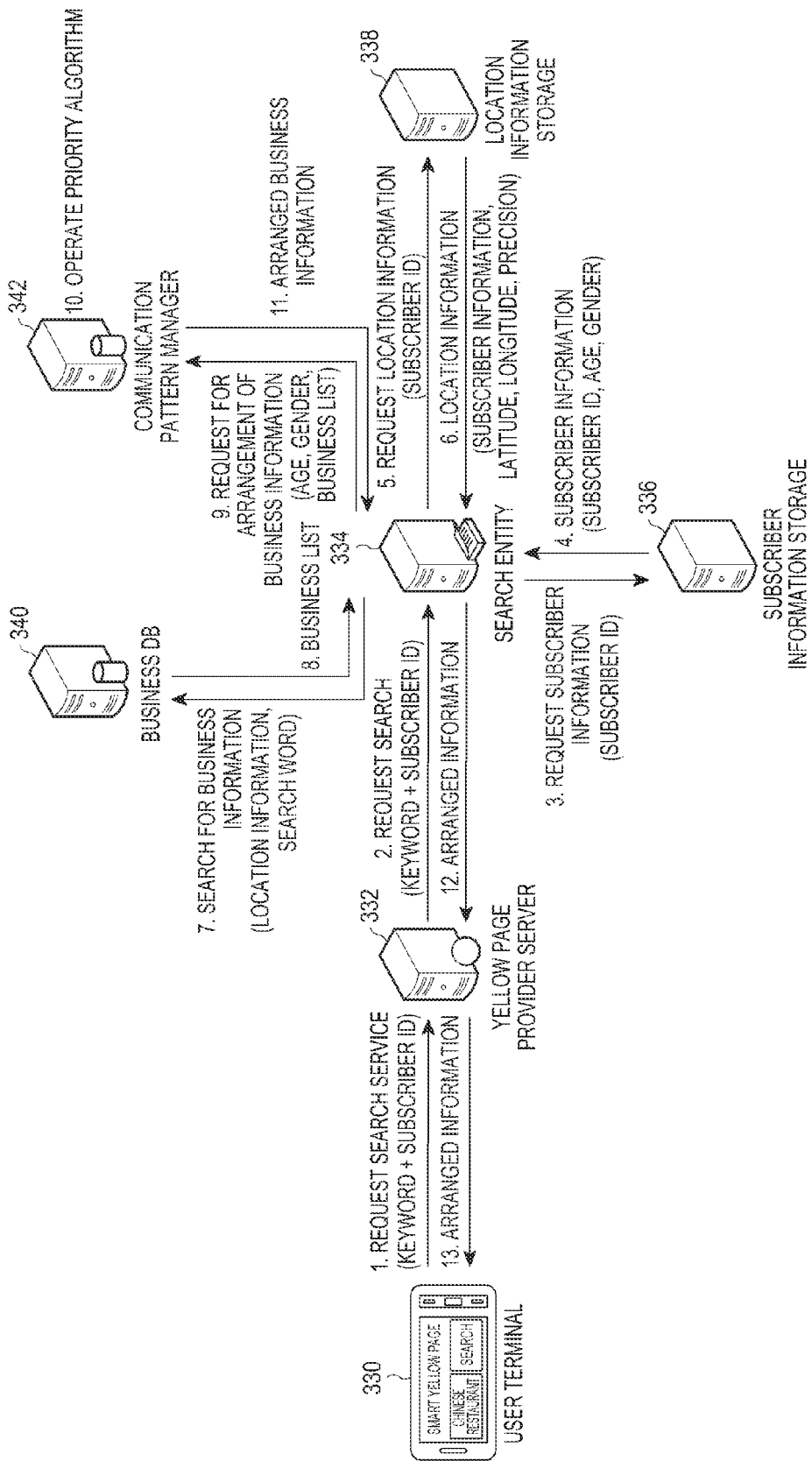
FIG. 3 is a view schematically illustrating a system for providing a yellow page service according an exemplary embodiment of the present invention.

FIG. 3 illustrates a system for providing a yellow page service according to an exemplary embodiment of the present invention.

Referring to FIG. 3, the system for providing a yellow page service includes a user terminal 330 configured to request a yellow page service, a yellow page provider server 332, a search entity 334, a subscriber information storage 336, a location information storage 338, a business DB 340, and a communication pattern manager 342. The elements other than the user terminal 330 may be realized as individual servers configured with separate entities, or be configured as internal entities operating in one network. For example, the communication pattern manager 342, the location information storage 338, and the subscriber information storage 336 may operate in the same provider network managing a mobile communication network to which the user terminal 330 is subscribed. Also, at least one of the search entity 334, the business DB 340, and the yellow page provider server 332 may operate in the same provider network according to an implementation of the provider network. As an alternative exemplary embodiment, at least two or more of the elements may be integrated as one entity. For example, the yellow page provider server 332 may be integrated with the search entity 334 according to an implementation of the provider network, and the subscriber location storage 336 and the location information storage 338 may be realized with as a Home Location Register (HLR).

The subscriber information storage 336 provides subscriber information, i.e., ages and genders, in response to a request of the search entity 334. The communication pattern manager 342 interworks with a switching center of the mobile communication network. The communication pattern manager 342 stores statistical information of communications with the businesses stored in the business DB (e.g., the number of calls in various conditions) according to genders, age groups, call time ranges of calling parties, and may additionally have a function of arranging the business list based on a priority algorithm according to a request of the search entity 334. In more detail, the communication pattern manager 342 stores statistical information (i.e., a communication pattern) regarding ages and genders, and call times of the subscribers who have requested calls from the businesses stored in the business DB, and arranges the business list based on the stored statistical information. A detailed search procedure according to a mutual operation between the illustrated elements will be described later with reference to FIG. 4.

According to an exemplary embodiment of the present invention, a similar subscriber group having subscriber information similar to that of the user who has requested a search is regarded to have a similar personality (taste) to that of the user, and a business list which has been endowed with a priority is provided to the user according to a search result regarding the businesses in the similar subscriber group. The similar subscriber group is determined according to subscriber information which has registered in a mobile communication network for the user according to predetermined criteria, and for example, may include subscribers whose gender and age group are the same of those of the user.

Figure 4:
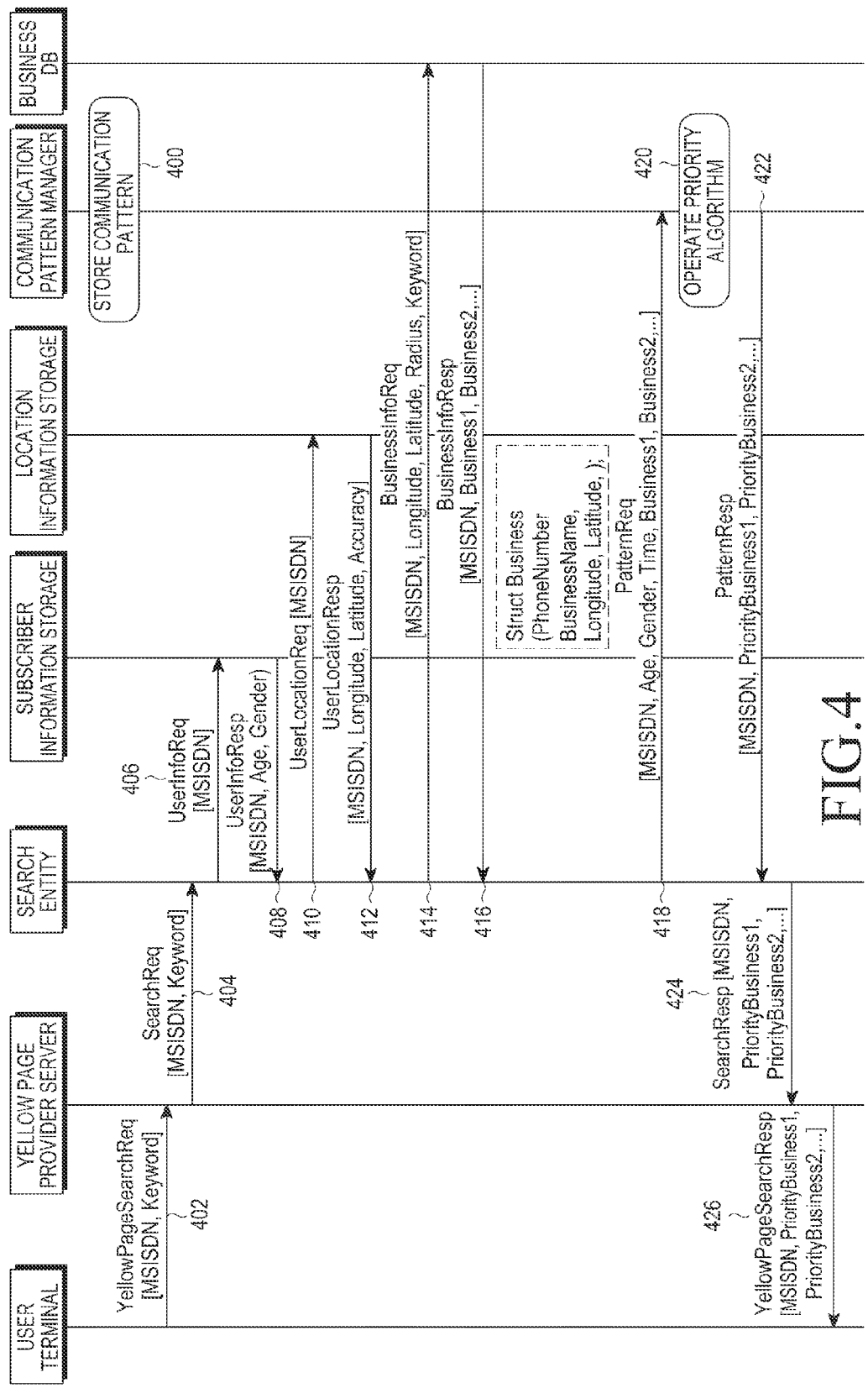
FIG. 4 is a message flowchart illustrating a yellow page search procedure where a personality of a user is reflected according to an exemplary embodiment of the present invention.

FIG. 4 is a message flowchart illustrating a yellow page search procedure reflecting a personality of a user according to an exemplary embodiment of the present invention.

Referring to FIG. 4, before a search request of the user, the communication pattern manager in step 400 continues to store and manage statistical information such as genders, ages, call times (i.e., communication pattern) of calling parties who have requested communications from the businesses registered in a business DB through interworking with an exchange of a mobile communication network.

In step 402, the user terminal transfers a yellow page search request message (YellowPageSearchReq) including a search keyword input by the user and a subscriber identifier of a user terminal to a yellow page provider server through a network (e.g., mobile communication network) accessed by the user. The subscriber identifier is used to identify the user terminal in the mobile communication network, and, for example, may include MSISDN, MIN, IMEI, ICCID, and IMSI.

In step 404, the subscriber identifier and the search keyword are included in a search request message (SearchReq) and are transferred from the yellow page provider server to a search entity (e.g., yellow page server). In step 406, the search entity includes the subscriber identifier in a user information request message (UserInfoReq) and transmits the user information request message to a subscriber information storage (e.g., a subscriber information server). The subscriber information storage manages various subscriber parameters/information regarding the mobile communication subscribers (i.e., users) to control various added services such as prohibition of origination/reception of calls. The subscriber information storage may be realized with the location information storage, and an example of the subscriber information storage may be a home location register. For interworking with the subscriber information storage, the search entity may operate in the same provider network as that of the location information storage, or mutually shares communication protocols according to a preset manner. In step 408, the subscriber information storage searches for user information, specifically, an age and a gender of the user terminal corresponding to the subscriber identifier, and sends, in response, a user information response message (UserInfoResp) including the subscriber identifier and the found user information to the search entity.

In step 410, the search entity includes the subscriber identifier in a user location request message (UserLocationReq) and transmits the user location request message to a location information storage (e.g., a location server such as a home location register). In step 412, the location information storage sends, in response, a user location response message (UserLocationResp) including a currently registered location, e.g., a cell ID or a latitude and a longitude of the user terminal to the search entity. Here, the user location response message (UserLocationResp) may additionally indicate a precision of the location.

In step 414, the search entity includes the search keyword together with the subscriber identifier, the location, and a radius about the location in a business information request message (BusinessInfoReq) and transfers them to the business DB. The radius may be optionally included. The radius indicates which businesses pertaining to a region within a certain range from the location of the subscriber will be searched for in the yellow page service, and may be determined in the search entity according to a service precision or input by the user through the user terminal. The business DB stores information, i.e., business names, phone numbers, addresses, brief introductions of the businesses which have allowed a search for their phone numbers, etc.

In step 416, the business DB transmits a business information response message (BusinessInfoResp) including a business list identifying businesses corresponding to the search keyword to the search entity. The business list corresponds to the search keyword, and contains information (e.g., business names, phone numbers, latitudes, and longitudes) regarding businesses located within the range of the radius about the location of the subscriber.

Once the search for the user information, the location information, and the business list is completed through the above-mentioned processes, the search entity performs an operation of giving a priority to the businesses identified in the business list, considering a preference of the user. The operation of giving a priority includes an operation of arranging in detail the business list according to a communication pattern of the similar subscriber group of the user, and may be performed by the search entity or the communication pattern manager according to an implementation of the designer. Steps 418 to 422 describe an exemplary embodiment of the present invention, and relate to an operation of giving a priority by the communication pattern manager.

In step 418, the search entity transfers a pattern request message (PatternReq) including the subscriber identifier, a gender, an age, a search time, and the business list to the communication pattern manager. The search time refers to a time point when a search is requested, and for example, may indicate a time point between a time point when the user terminal requested a search and a time point when the search entity transmitted the pattern request message. In step 420, the communication pattern manager arranges businesses in the business list based on genders, age groups, and search time ranges included in the pattern request message. In more detail, the communication pattern manager arranges the businesses in an order of how often a similar subscriber group having the same gender and age group as the requested gender and age group has performed the search in a time range including the search time. The similar age group means a predetermined range centered at age A of the user such as twenties, thirties, forties, and fifties according to a predetermined criteria, or a range from A−n to A+n (n is a predetermined positive integer). The time ranges including the search time may be determined as time ranges including the search time among a plurality of time ranges such as the morning, the afternoon, and the night according to a criteria. In step 422, the communication pattern manager includes the business list to which a priority has been given and includes the subscriber identifier and the arranged businesses in a pattern response message (PatternResp) and transmits the pattern response message to the search entity.

In step 424, the business list to which the priority has been given is included in a search response message (SearchResp) and is provided to the yellow page provider server, and in step 426, the yellow page provider server includes the business list in a yellow page search response message (YellowPageSearchResp) and provides the yellow page search response message to the user terminal. Then, the user can acquire the phone numbers of the businesses reflecting the preference of the similar subscriber group without inputting additional information.

Steps 418 to 422 describe an operation of receiving a business list to which a priority has been given by the communication pattern manager in the search entity. In another exemplary embodiment of the present invention, after inquiring and receiving communication pattern information regarding a similar subscriber group of the user from the communication pattern manager, the search entity may directly give a priority to the businesses list based on the communication pattern information. To achieve this, the search entity transmits an age, a gender, a location (e.g., latitude/longitude), and a search time of the user to the communication pattern manager, and receives a business list regarding the top N (N is a natural number) businesses frequently searched by the similar subscriber group of the user and to which a priority has not been given. Then, the search entity arranges the business list to which a priority has not given according to a predetermined criteria, and provides the arranged business list as a search result to the user terminal through the yellow page provider server.

Figure 5:
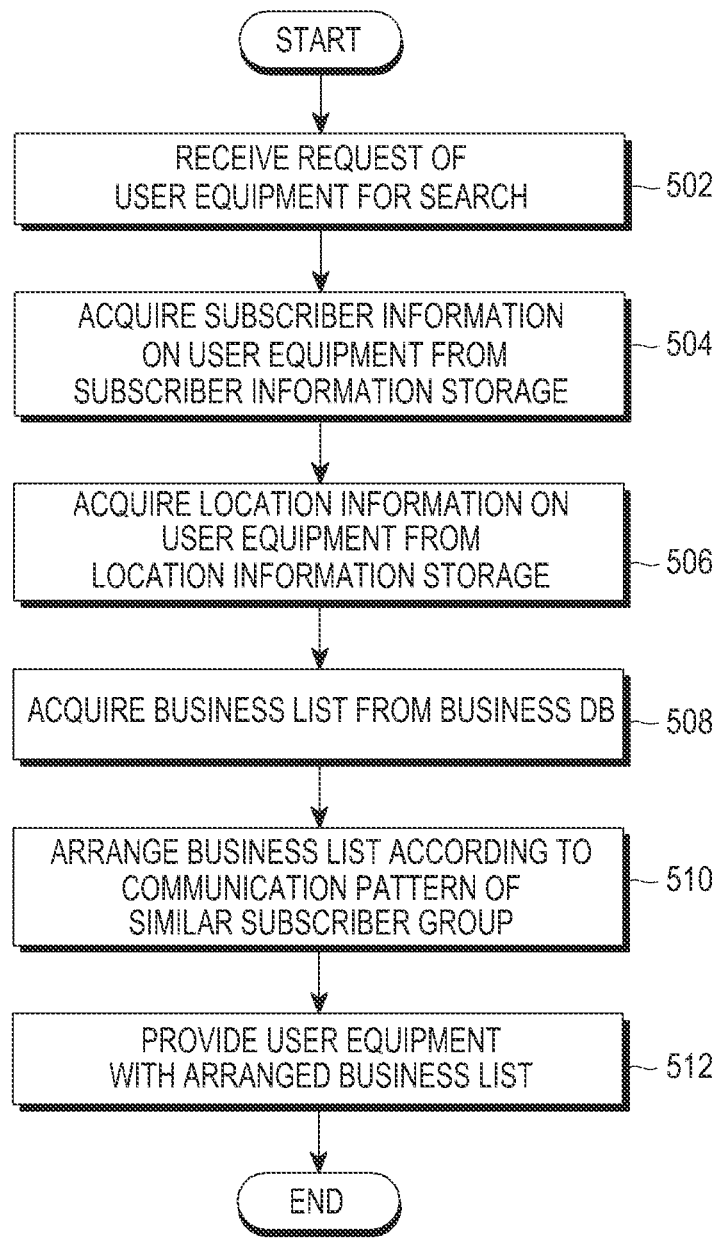
FIG. 5 is a flowchart illustrating an operation of a search entity according to an exemplary embodiment of the present invention.

FIG. 5 is a flowchart illustrating an operation of a search entity according to an exemplary embodiment of the present invention.

Referring to FIG. 5, in step 502, a search request is received from a user terminal to a search entity. The search request includes a search keyword input by the user and a subscriber identifier of the user terminal. In step 504, the search entity inquires of and acquires subscriber information (e.g., gender and age) of the user terminal from a subscriber information storage based on the subscriber identifier. Similarly, in step 506, the search entity inquires of and acquires location information (e.g., latitude/longitude) of the user terminal from a location information storage based on the subscriber identifier. Here, it is noted that steps 504 and 506 are sequentially performed, or are performed independently or in parallel.

In step 508, the search entity requests and acquires a business list based on the search keyword and the location information from a business DB. In step 510, the search entity arranges the business list according to a communication pattern of a similar subscriber group of the user terminal based on the subscriber information, the search time, and the location information. In more detail, the business list is sequentially arranged in the order of frequencies in an order of how often the subscribers of a similar subscriber group have communicated with the businesses included in the business list, and the businesses other than the top-ranking businesses may be removed from the business list. In step 512, the arranged business list is provided to the user terminal which has generated the search request.

Figure 6:
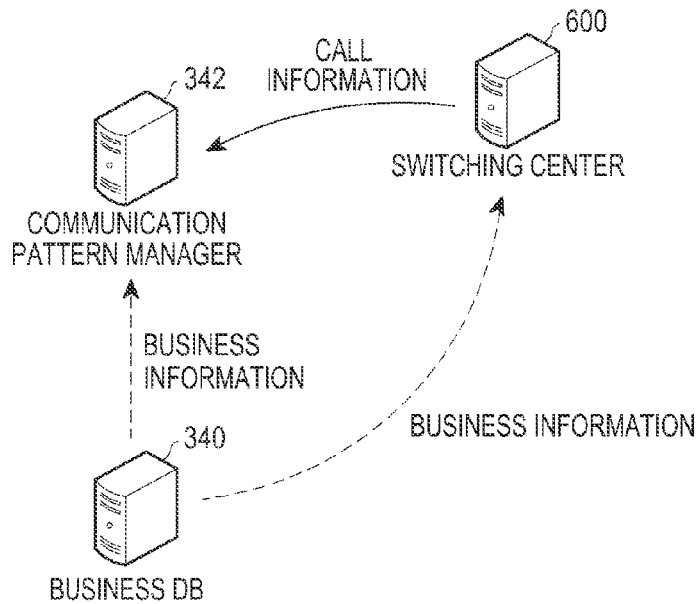
FIG. 6 is a view illustrating a system for managing and storing communication patterns of mobile communication subscribers according to an exemplary embodiment of the present invention.

FIG. 6 illustrates a system for storing and managing a communication pattern of mobile communication subscribers according to an exemplary embodiment of the present invention.

Referring to FIG. 6, a communication pattern manager 342 interworks with a switching center 600 of a mobile communication network. Whenever calls for registered businesses are originated, the communication pattern manager 342 receives call information including calling numbers and called numbers for the calls from a switching center 600, and counts of the number of calls for each business according to a gender, an age group, and a call origination time of the subscriber. To achieve this, the switching center 600 and the communication pattern manager 342 can receive information on the businesses which have allowed searches for their phone numbers from the business DB 340. For example, when a call for businesses registered in the business DB 340 is originated, the switching center 600 provides information of the call to the communication pattern manager 342. As an alternative example, when the communication pattern manager 342 determines that the call is a call received by a business registered in the business DB 340 with reference to the call information received from the switching center 600, the communication pattern manager 342 counts the corresponding call.

Figure 7:
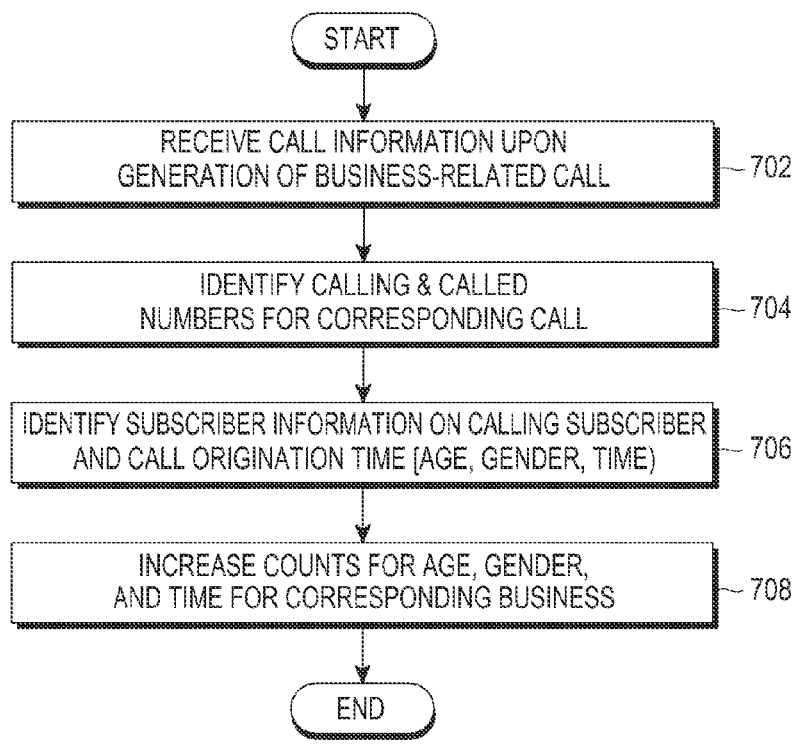
FIG. 7 is a flowchart illustrating an operation of managing communication patterns according to an exemplary embodiment of the present invention.

FIG. 7 is a flowchart illustrating an operation of managing a communication pattern according to an exemplary embodiment of the present invention.

Referring to FIG. 7, in step 702, when a call related to a business which has allowed searches for its phone number, e.g., a call transmitted to the business is originated, the communication pattern manager receives call information regarding the call from a switching center. In step 704, the communication pattern manager identifies a calling number and a called number contained in the call information, and in step 706, the communication pattern manager identifies subscriber information of a calling subscriber corresponding to the calling number, i.e., an age, a gender, and a call origination time. In step 708, the communication pattern manager increases the counts for the age, the gender, and the call origination time for the business by one respectively.

Figure 8A:
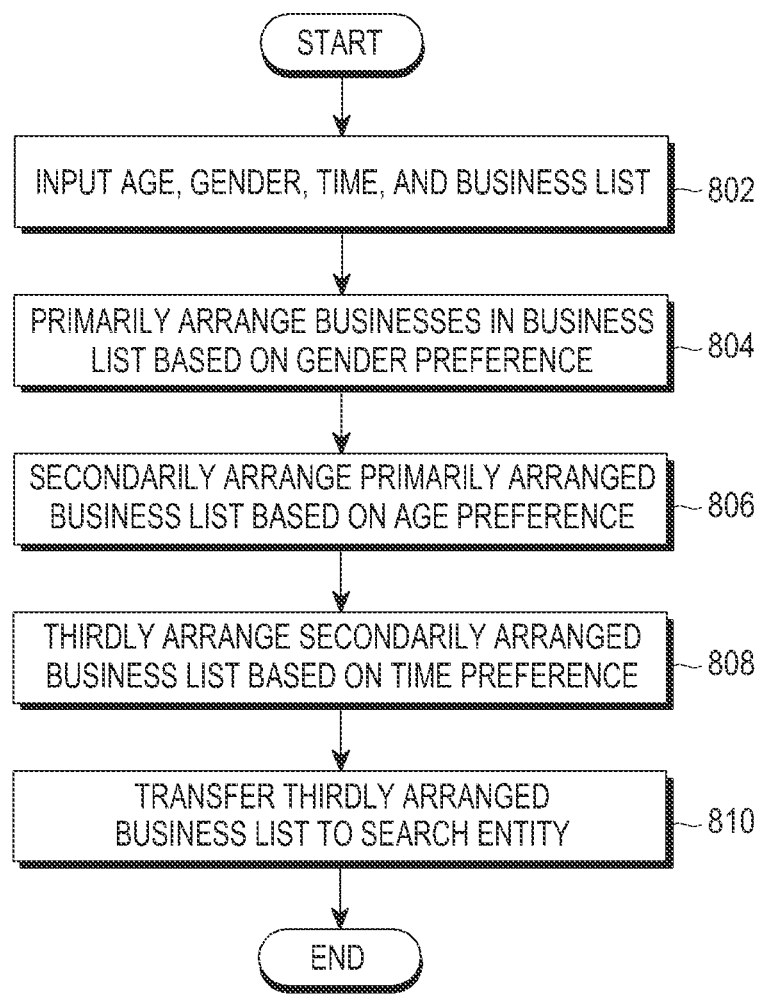
FIGS. 8A and 8B are flowcharts illustrating operations of arranging a business list by a communication pattern manager according to exemplary embodiments of the present invention.

FIG. 8A is a flowchart illustrating an operation of arranging a business list in a communication pattern manager according to an exemplary embodiment of the present invention.

Referring to FIG. 8A, in step 802, the communication pattern manager receives a business list regarding an age, a gender, a search time, and a search keyword of the user terminal which intends to search for a business, from the search entity. As mentioned above, the business list includes businesses which have been searched for with reference to a current location of the user terminal. Then, in step 804, the communication pattern manager primarily arranges the businesses in the business list according to a communication pattern of the subscribers who have the same gender as the subscriber of the user terminal. For example, when a subscriber of a user terminal is a male, the businesses in the business list are arranged in ascending order based on the call counts for male subscribers.

In step 806, the primarily arranged business list is secondarily arranged according to the communication pattern of the subscribers having the same age group as the subscriber of the user terminal. For example, when the subscriber of the user terminal is in his or her twenties, the businesses of the primarily arranged business list are arranged in ascending order based on the call counts for the subscribers in their twenties. In step 808, the secondarily arranged business list is arranged thirdly according to a time when the user terminal requested a search. For example, when the search time pertains to a lunch time, the businesses of the secondarily arranged business list are arranged in ascending order based on the call counts for lunch time. In step 810, the thirdly arranged business list is provided as a search list to the search entity.

Figure 8B:
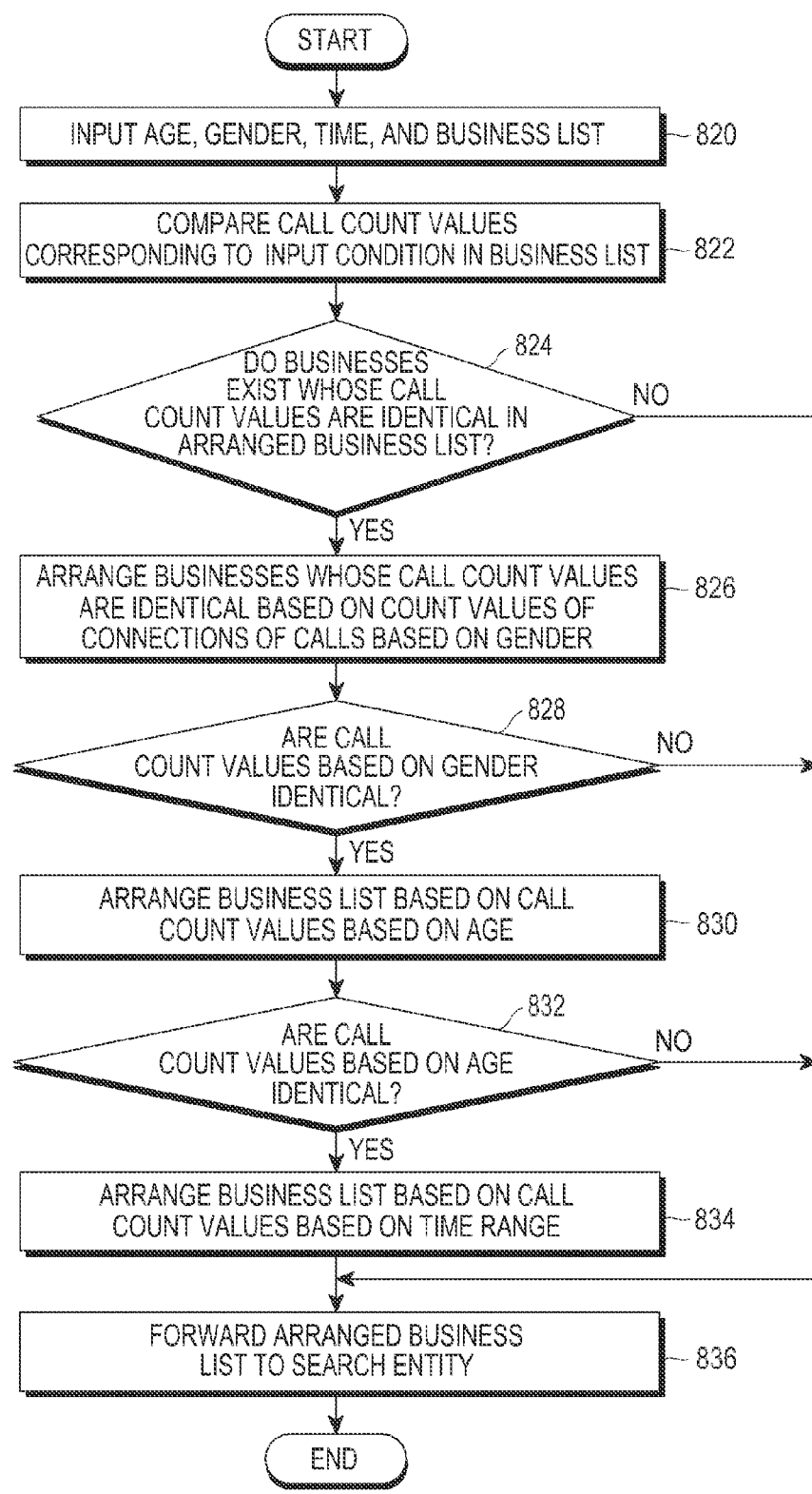

FIG. 8B is a flowchart illustrating an operation of arranging a business list in a communication pattern manager according to an exemplary embodiment of the present invention.

Referring to FIG. 8B, in step 820, the communication pattern manager receives a business list regarding an age, a gender, a search time, and a search keyword of the user of a user terminal who intends to search a business from the search entity. In step 822, the communication pattern manager compares and arranges call count values which are sent to businesses of the business list by subscribers having the same gender and age group as those of the subscriber of the user terminal having the same search time. In step 824, the communication pattern manager checks whether businesses exist in the arranged business list, whose call count values are identical to each other, and if no such business exists, the operation proceeds to step 836. On the other hand, if businesses exist whose call count value are identical to each other, they are arranged based on the call count value for gender in step 826.

In step 828, the communication pattern manager checks whether businesses exist in the arranged business list, whose call count values for gender are identical to each other, and if no such business exists, the operation proceeds to step 836. On the other hand, if businesses exist whose call count value for gender are identical to each other, they are arranged based on the call count value for age group in step 830. In step 832, the communication pattern manager determines if businesses having an identical call count value for an age group that exists in the arranged business list. When such businesses do not exist in the arranged business list, the communication pattern manager proceeds to step 836. On the other hand, if businesses exist whose call count value for an age group are identical to each other, they are arranged based on the call count value for time ranges in step 834.

In step 836, the communication pattern manager forwards the business list arranged in one of steps 822, 826, 830, and 834 as a search result to the search entity.

Hereinafter, an operation of giving priorities to the businesses according to the communication pattern will be described with an example. Tables 1 to 3 exemplify communication patterns accumulated by the communication pattern manager.

TABLE 1

| PATTERN A | | | MORNING | LUNCH | EVENING | NIGHT | |
|---|---|---|---|---|---|---|---|
| A BEER BAR | TEENS | MALE | 0 | 0 | 0 | 0 | 0 |
| MALE | | FEMALE | 0 | 0 | 0 | 0 | |
| 4057 | TWENTIES | MALE | 2 | 17 | 50 | 12 | 113 |
| FEMALE | | FEMALE | 0 | 7 | 21 | 4 | |
| 1449 | THIRTIES | MALE | 5 | 38 | 32 | 52 | 175 |
| | | FEMALE | 0 | 12 | 24 | 12 | |
| | FORTIES | MALE | 15 | 154 | 274 | 125 | 754 |
| | | FEMALE | 5 | 35 | 123 | 23 | |
| | FIFTIES | MALE | 23 | 235 | 567 | 765 | 2296 |
| | | FEMALE | 8 | 135 | 198 | 365 | |
| | SIXTIES | MALE | 18 | 200 | 375 | 368 | 1225 |
| | | FEMALE | 5 | 40 | 96 | 123 | |
| | SEVENTIES | MALE | 12 | 100 | 342 | 276 | 943 |
| | OR MORE | FEMALE | 2 | 34 | 78 | 99 | |
| | | | 95 | 1007 | 2180 | 2224 | 5506 |

TABLE 2

| PATTERN B | | | MORNING | LUNCH | EVENING | NIGHT | |
|---|---|---|---|---|---|---|---|
| B RESTAURANT | TEENS | MALE | 0 | 20 | 30 | 20 | 191 |
| MALE | | FEMALE | 0 | 32 | 59 | 30 | |
| 852 | TWENTIES | MALE | 0 | 20 | 50 | 175 | 1592 |
| FEMALE | | FEMALE | 0 | 236 | 487 | 624 | |
| 2548 | THIRTIES | MALE | 0 | 30 | 235 | 223 | 1492 |
| | | FEMALE | 0 | 214 | 312 | 478 | |
| | FORTIES | MALE | 0 | 8 | 21 | 20 | 125 |
| | | FEMALE | 0 | 10 | 34 | 32 | |
| | FIFTIES | MALE | 0 | 0 | 0 | 0 | 0 |
| | | FEMALE | 0 | 0 | 0 | 0 | |
| | SIXTIES | MALE | 0 | 0 | 0 | 0 | 0 |
| | | FEMALE | 0 | 0 | 0 | 0 | |
| | SEVENTIES | MALE | 0 | 0 | 0 | 0 | 0 |
| | OR MORE | FEMALE | 0 | 0 | 0 | 0 | |
| | | | 0 | 570 | 1228 | 1602 | 3400 |

TABLE 3

| PATTERN C | | | MORNING | LUNCH | EVENING | NIGHT | |
|---|---|---|---|---|---|---|---|
| C RESTAURANT | TEENS | MALE | 0 | 54 | 178 | 226 | 1135 |
| MALE | | FEMALE | 0 | 78 | 251 | 348 | |
| 4018 | TWENTIES | MALE | 0 | 275 | 321 | 541 | 2438 |
| FEMALE | | FEMALE | 0 | 247 | 397 | 657 | |
| 4964 | THIRTIES | MALE | 0 | 348 | 432 | 678 | 3445 |
| | | FEMALE | 0 | 453 | 647 | 887 | |
| | FORTIES | MALE | 0 | 176 | 247 | 542 | 1964 |
| | | FEMALE | 0 | 264 | 324 | 411 | |
| | FIFTIES | MALE | 0 | 3 | 7 | 21 | 54 |
| | | FEMALE | 0 | 0 | 6 | 17 | |
| | SIXTIES | MALE | 0 | 0 | 3 | 7 | 15 |
| | | FEMALE | 0 | 0 | 2 | 3 | |
| | SEVENTIES | MALE | 0 | 0 | 0 | 0 | 0 |
| | OR MORE | FEMALE | 0 | 0 | 0 | 0 | |
| | | | 0 | 1898 | 2815 | 4338 | 9051 |

In the following example, it is assumed that a search keyword is "chicken store", the gender of the user of a user terminal who requested a search is "man", his age group is "twenties", and the search time is "evening".

The stored communication patterns of the businesses related to the search keyword, i.e., business A, B, and C are as in Tables 1 to 3, and the priorities based on the stored communication patterns are as follows.

1. Business C: Male/Twenties/Evening—321 calls
2. Business B: Male/Twenties/Evening—50 calls
3. Business A: Male/Twenties/Evening—50 calls If the call count values of business A and business B are identical to each other as exemplified, business B and business A are arranged according to the priorities set by a yellow page provider server. As illustrated in the flowcharts of FIGS. 8A and 8B, when the set priorities are given in the order of gender, age group, and time, since a call count value of business B for male is 852 and a call count value of business A for male is 4057, the final priorities shown to the user is as follows.

1. Business C: Male/Twenties/Evening—321 calls
2. Business A: Male/Twenties/Evening—50 calls (Male: 4057)

3. Business B: Male/Twenties/Evening—50 calls (Male: 852)

As a modified example, if their call count values for Male are identical to each other, the businesses are arranged again according to the call count value for twenties.

Figure 9:
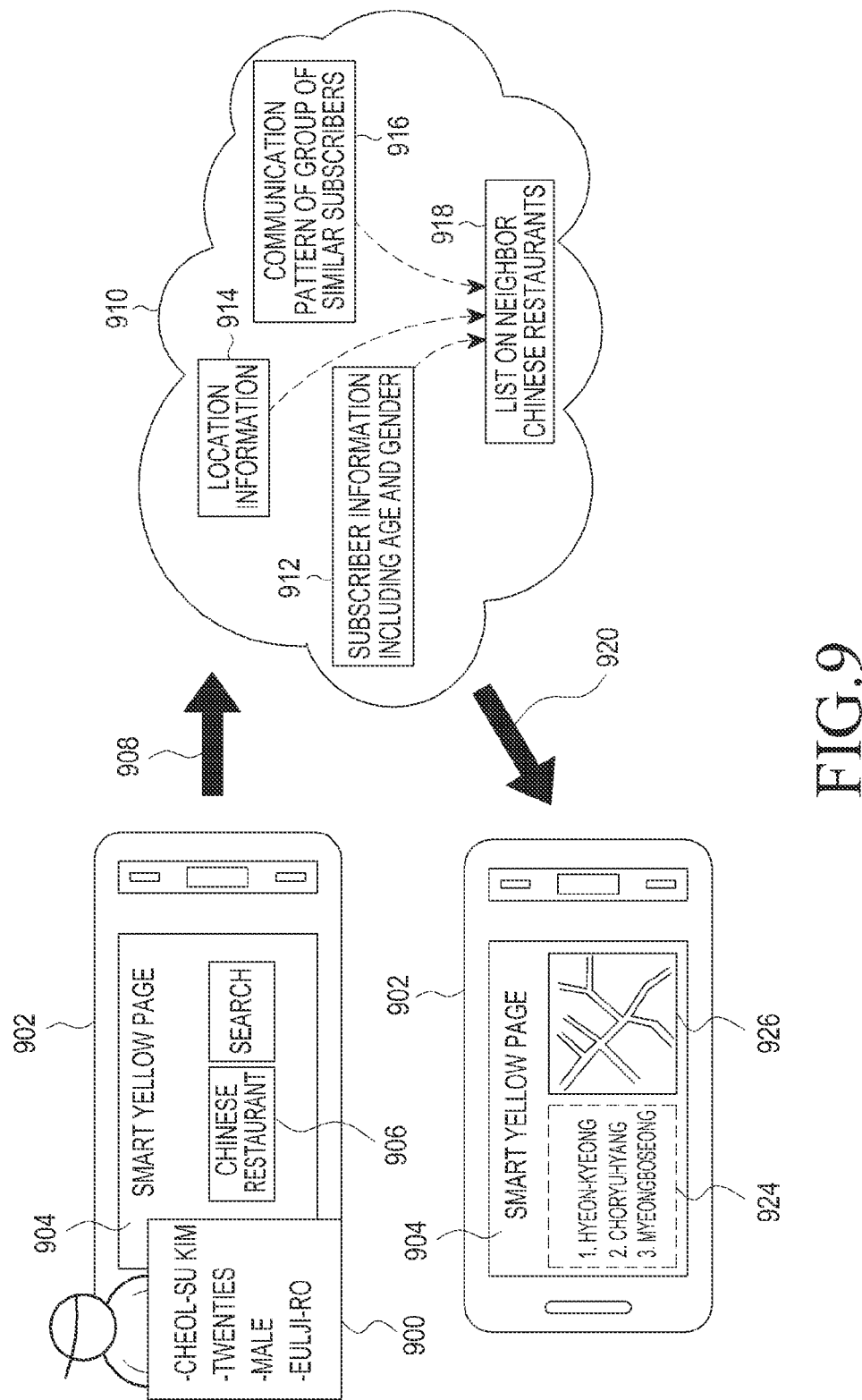
FIG. 9 is a view illustrating a search result provided through a yellow page service according to an exemplary embodiment of the present invention.

FIG. 9 illustrates an example of a search result provided through a yellow page service according to an exemplary embodiment of the present invention.

Referring to FIG. 9, the user 900 of a user terminal 902 is 'Cheolsoo Kim' who is located on 'Eulji-Ro' and is a male in his twenties, and implements a smart yellow page 904 which is an application for a yellow page service by manipulating the user terminal 902. The subscriber inputs a desired search keyword 906, e.g., 'Chinese restaurant' through a search window of the smart yellow page 904. The search keyword 906 and the subscriber ID of the user terminal 902 are transferred to a search system 910 providing a yellow page service through a search request 908. The search system 910 may be configured as illustrated in FIG. 3 as an example. The search system 910 acquires at least one of subscriber information 912, location information 914 of the user terminal 902, and a communication pattern 916 of a group of similar subscribers based on the search keyword 906 and the subscriber ID contained in the search request 908, and determines a business list 918 including nearby Chinese restaurants preferred by the user 900 based on the acquired information. The business list 920 is provided to the user terminal 902 through a search response 920, and the user terminal 902 displays the names of the nearby Chinese restaurants 924 included in the business list 918 through a search result screen of the smart yellow page 904. Then, the business list 918 may further include additional information on local map images together with the names and phone numbers of the found businesses. The smart yellow page 904 may display detailed information on the businesses selected by the user among the Chinese restaurants 924 displayed on the screen, e.g., a neighbor map 926 on the same screen.

If the businesses acquired through the yellow page service are displayed on the screen of the user terminal, the user selects a name of a desired business among the businesses displayed on the screen through manipulation of a keyboard or a touch input to allow the user terminal to automatically attempt connection of a call to the selected business.

Figure 10:
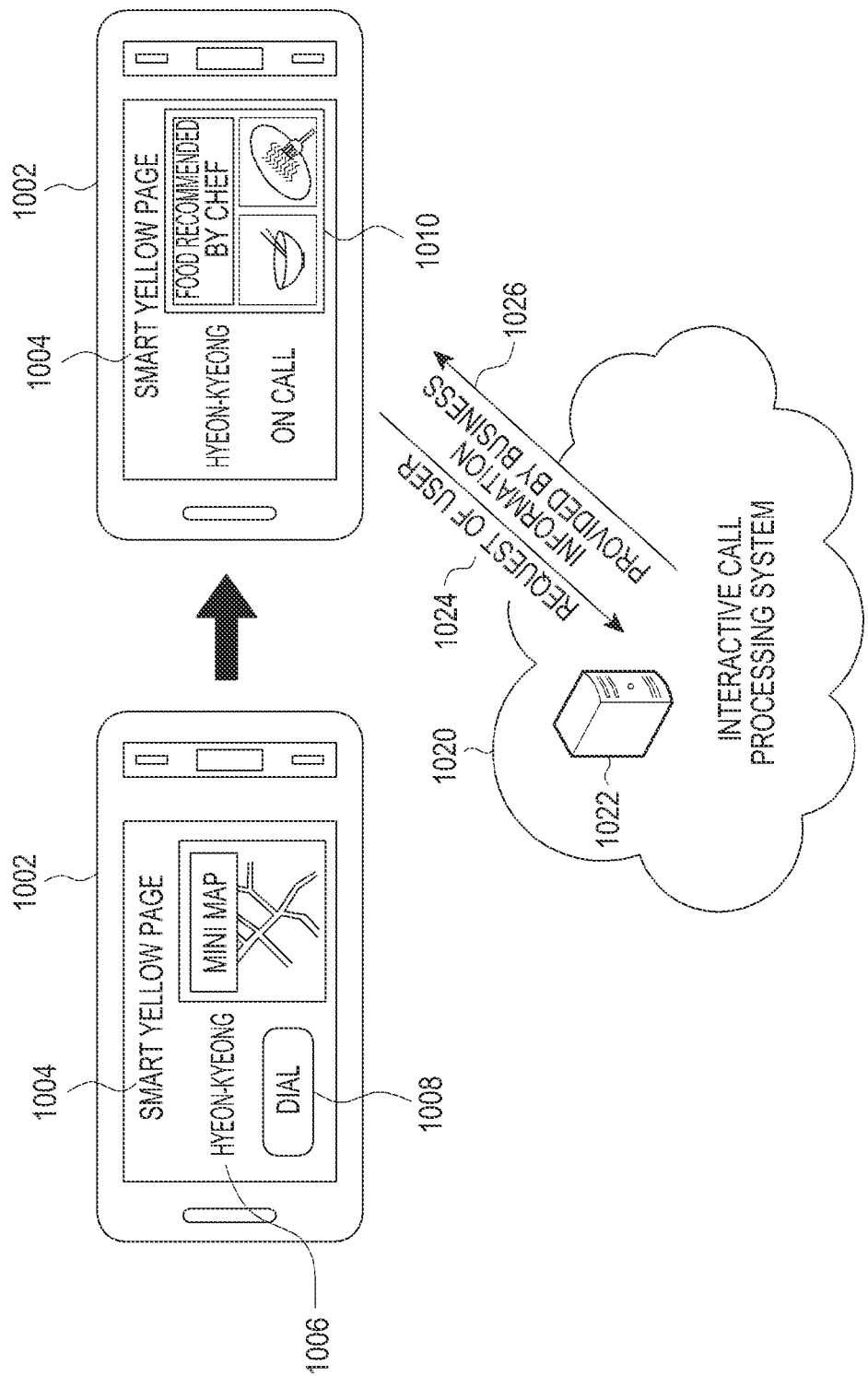
FIG. 10 is a view illustrating an operation of automatically accessing a desired business through a search result according an exemplary embodiment of the present invention.

FIG. 10 illustrates an operation of automatically connecting to a desired business through a search result according to an exemplary embodiment of the present invention.

Referring to FIG. 10, the user terminal 1002 displays detailed information, e.g., a local map of a Chinese Restaurant 'Hyeon-gyoung' which is a business 1006 selected by the user among the search results through a screen of a smart yellow page 1004 which is an application for a yellow page service. In addition, a 'dial' icon 1008 through which the user can make a call to the selected business 1006 is displayed together on the screen. If the user selects the 'dial' icon 1008 through manipulation of a keypad or a touch input, the user terminal 1002 automatically attempts connection of a call to a phone number of the selected business 1006.

In an exemplary embodiment of the present invention, when the selected business 1006 has subscribed to an interactive call processing service, the user may select, in the case that the selected business 1006 is a restaurant, at least one desired food through the smart yellow page screen while performing a communication with the selected business 1006 through the user terminal 1002, and may be provided with an image of the selected food or information of a food recommended by the selected business 1006. To achieve this, the user terminal 1002 connects to an interactive call processing system 1022 in a network 1020 while connecting a call to the selected business. The interactive call processing system 1022 may be directly managed by the corresponding business or may be managed by a specialist management business, receives and analyzes a request 1024 of the user terminal connecting a call to the corresponding business, and provides information 1026 provided by the business corresponding to the request 1024 of the user to the user terminal 1002.

For example, if the user terminal 1002 establishes a call connection with a desired business and requests the business to prepare for an order of a food, the interactive call processing system 1022 provides a list of all foods or recommended foods provided by the business, during the call connection. The list may include a brief introduction of each food together with an image of the food. In addition, the user may see the food image 1010 displayed on the screen and may transmit an inquiry on a corresponding food to the interactive call processing system 1022. In response, the interactive call processing system 1022 provides a reply of the business to the inquiry through a screen of the user terminal 1002.

Figure 11:
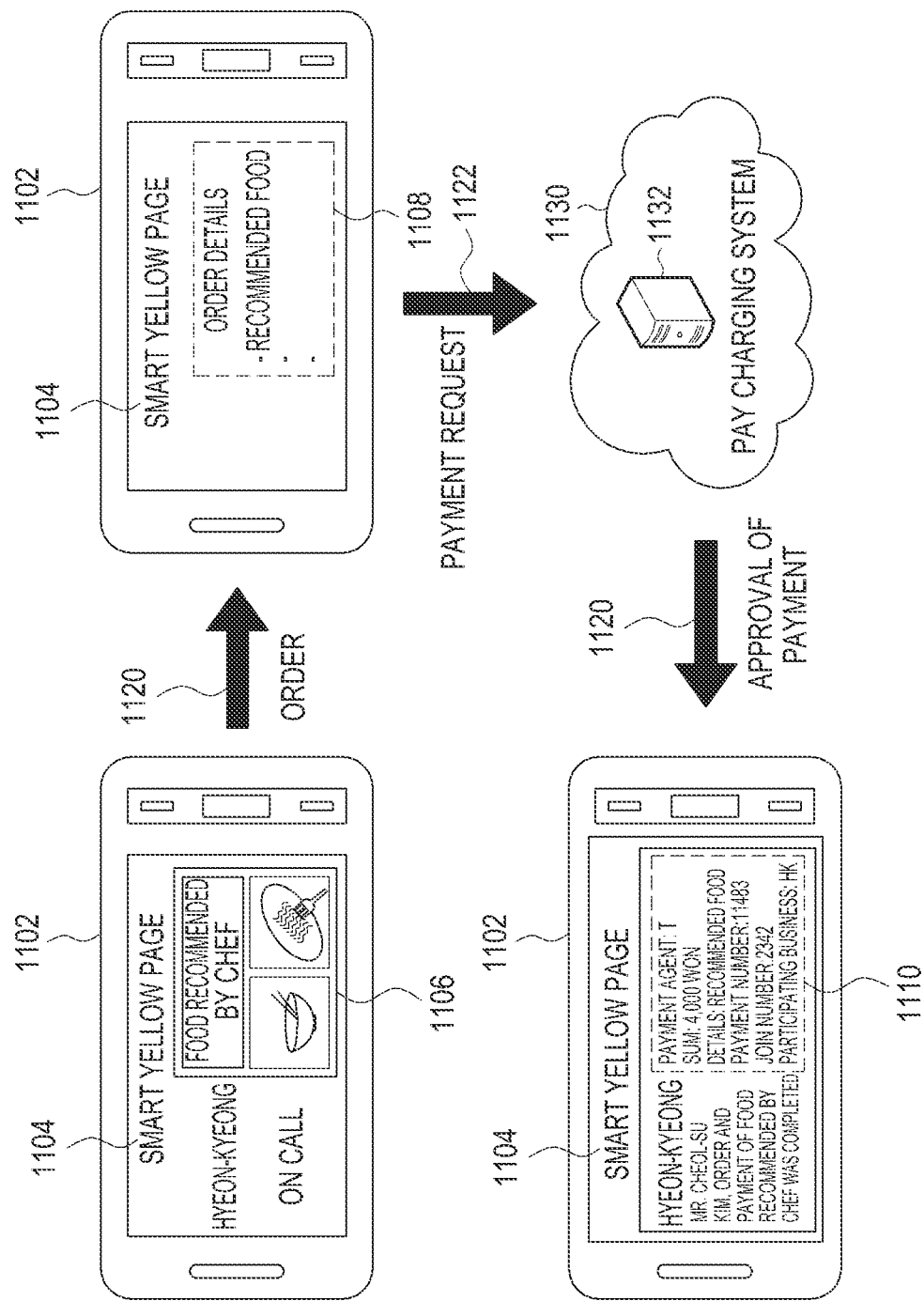
FIG. 11 is a view illustrating a payment operation during a communication according to an exemplary embodiment of the present invention.

FIG. 11 illustrates a payment operation during connection of a call according to an exemplary embodiment of the present invention.

Referring to FIG. 11, a user terminal 1102 displays a search result through a screen of a smart yellow page 1104 which is an application for a yellow page service, and displays, if a call is connected to a business selected by the user among the search result, information, e.g., a food image 1106 provided by a business according to a request of a user or a designation of the business during call connection. If the user orders 1120 a desired food through the food image 1106, the smart yellow page 1104 provides details 1108 of the order 1120 on the display during connection of a call to allow the user to confirm selections of the user. If the user confirms the order 1120, the smart yellow page 1104 transmits a payment request 1122 to a fee charging system 1132 in a network 1130. The fee charging system 1132 may operate in a mobile communication network to which the user terminal 1102 has subscribed or be managed by a separate fee charging business. If the fee charging system 1132 authenticates the user terminal 1102 and confirms a separately defined payment means (e.g., communication fee or a credit card), payment authentication 1120 is transmitted from the fee charging system 1132 to the user terminal 1102. The smart yellow page 1104 which is being executed in the user terminal 1102 displays details 1110 of the payment according to the payment authentication 1120 on the screen. Thereafter, if no additional request of the user exists, the call connection may be automatically ended. Accordingly, the user can process a payment request and confirmation of the authentication details while maintaining connection of a call.

According to exemplary embodiments of the present invention, even if a user who desires to search for a phone number does not make an explicit request, a search result can be arranged and provided, reflecting a preference of a person based on information on a communication pattern provided by a communication provider. Accordingly, information on businesses can be provided to the user properly while securing convenience of searching for the user. Furthermore, the user can be provided with a list of businesses preferred by a group of similar subscribers having the same age group and gender as those of the user even through a simple search procedure identical to a search procedure of the related art.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing a phone directory service to a user terminal in a mobile communication network, the method comprising:
   receiving a search request including a search keyword for the phone directory service and a subscriber identifier for the user terminal from the user terminal;
   acquiring subscriber information of a subscriber corresponding to the user terminal from the mobile communication network in which the user terminal is registered using the subscriber identifier;
   acquiring a business list of businesses corresponding to the search keyword from a business DataBase (DB) for managing businesses that have subscribed to the phone directory service;
   arranging the business list according to statistical information of call information of calls to the businesses including call count values of calls for genders, age groups, and call origination times for the businesses stored in the business DB by a group of similar subscribers that have been determined to have subscriber information similar to that of the subscriber corresponding to the user terminal according to a predetermined criteria; and
   providing, in response to the search request, the phone directory service comprising the arranged business list to the user terminal.

2. The method as claimed in claim 1, wherein the subscriber information includes a gender and an age of the subscriber corresponding to the user terminal.

3. The method as claimed in claim 1, wherein, the statistical information of communications with the businesses indicates call count values of calls made by the group of similar subscribers to the businesses that have subscribed to the phone directory service, for each of a gender, an age group, and call origination time ranges of the group of similar subscribers.

4. The method as claimed in claim 1, wherein in the arranging of the business list, the businesses included in the business list are arranged according to a call count value of calls made by the group of similar subscribers, having a same gender and a same age group as the subscriber corresponding to the user terminal, to the businesses included in the business list.

5. The method as claimed in claim 1, wherein the arranging of the business list includes:
   arranging the business list in ascending order according to a call count value of calls made by subscribers of the group of similar subscribers, having a same gender as that of the subscriber corresponding to the user terminal, to the businesses of the business list;
   arranging the business list in ascending order according to a call count value of calls made by subscribers of the group of similar subscribers, having a same age group as that of the subscriber corresponding to the user terminal, to the businesses of the business list; and
   arranging the business list in ascending order according to origination times of calls made by subscribers of the group of similar subscribers, having the same gender and age group as that of the subscriber corresponding to the user terminal, to the businesses of the business list.

6. The method as claimed in claim 1, wherein the business list corresponding to the search keyword includes businesses searched for according to location information of the user terminal acquired from the mobile communication network using the subscriber identifier.

7. A method of providing a phone directory service of businesses, the method comprising:
   receiving, when a call is generated to one of businesses that have subscribed to the phone directory service, call information regarding the call;
   identifying a calling number and a called number for the call in the call information;
   identifying subscriber information comprising a gender and an age group of a calling subscriber corresponding to the calling number, and a call origination time for the call;
   increasing call count values of calls for the gender and age group of the corresponding business and a call origination time, respectively; and
   providing, in response to a search query, the phone directory service comprising a business list of one or more of the businesses that have subscribed to the phone directory service, according to statistical information of the call information of calls to the businesses including call count values of calls for genders, age groups, and call origination times for the businesses that have subscribed to the phone directory service.

8. The method as claimed in claim 7, wherein in the providing of the phone directory service for the businesses, the businesses included in the business list are arranged according to call count values of calls made by a group of similar subscribers, having a same gender and a same age group as a subscriber corresponding to a user terminal that has requested a search, to the businesses included in the business list.

9. The method as claimed in claim 7, wherein the providing of the phone directory service for the businesses includes:
   acquiring the business list corresponding to a search keyword input at a user terminal;
   arranging the business list according to a call count value of calls made by subscribers, having a same gender as that of a subscriber corresponding to the user terminal, to the businesses of the business list;
   arranging the business list in ascending order according to a call count value of calls made by subscribers, having a same age group as that of the subscriber corresponding to the user terminal, to the businesses of the business list; and
   arranging the business list in ascending order according to origination times of calls made by subscribers, having the same gender and age group as the subscriber corresponding to the user terminal, to the businesses of the business list.

10. A system for providing a phone directory service to a user terminal in a mobile communication network, the system comprising:
   a search entity for receiving a search request including a search keyword for the phone directory service and a subscriber identifier of the user terminal from the user terminal, and for providing a search result corresponding to the search request to the user terminal in response to the search request;
   a subscriber information storage for receiving the subscriber identifier from the search entity and for providing subscriber information of the user terminal to the search entity;
   a business DataBase (DB) for managing information of businesses that have subscribed to the phone directory service, and for receiving the search keyword from the search entity to provide a business list of the businesses corresponding to the search keyword; and
   a communication pattern manager for storing and managing statistical information of communications with the businesses stored in the business DB by a group of similar subscribers that have been determined to have subscriber information similar to that of a subscriber corresponding to the user terminal according to a predetermined criteria, wherein the search result includes a result obtained by arranging the business list according to the statistical information of call information of calls to the businesses including call count values of calls for genders, age groups, and call origination times for the businesses stored in the business DB by the group of similar subscribers that have been determined to have subscriber information similar to that of the subscriber corresponding to the user terminal.

11. The system as claimed in claim 10, wherein the subscriber information includes a gender and an age of a subscriber corresponding to the user terminal.

12. The system as claimed in claim 10, wherein, the statistical information of communications with the businesses indicates call count values of calls made by the group of similar subscribers to the businesses that have subscribed to the phone directory service, for each of a gender, an age group, and call origination time range of the group of similar subscribers.

13. The system as claimed in claim 10, wherein the communication pattern manager receives the subscriber information and the business list from the search entity, and arranges the businesses included in the business list according to a call count value of calls made by the group of similar subscribers, having a same gender and a same age group as the subscriber corresponding to the user terminal, to the businesses included in the business list.

14. The system as claimed in claim 10, wherein the communication pattern manager receives the subscriber information and the business list from the search entity, and arranges the business list in ascending order according to a call count value of calls made by subscribers, having a same gender as that of the subscriber corresponding to the user terminal, to the businesses of the business list, arranges the business list in ascending order according to a call count value of calls made by subscribers, having a same age group as that of the subscriber corresponding to the user terminal, to the businesses of the business list, and arranges the business list in ascending order according to origination times of calls made by subscribers, having the same gender and age group as those of the subscriber corresponding to the user terminal, to the businesses of the business list.

15. The system as claimed in claim 10, wherein the business list corresponding to the search keyword includes businesses searched for according to location information of the user terminal acquired from the mobile communication network using the subscriber identifier.

16. The system as claimed in claim 10, wherein the communication pattern manager receives, when a call is generated to be sent to one of businesses that have subscribed to the phone directory service, call information regarding the call, identifies a calling number and a called number for the call in the call information, identifies a gender and an age group of a calling subscriber corresponding to the calling number, and a call origination time for the call, increases call count values of calls for the gender and age group of the corresponding business and a call origination time respectively, and manages the statistical information including call count values of calls for genders and age groups of businesses that have subscribed to the phone directory service and call origination times.

* * * * *